Dec. 25, 1934.  D. CLUTE  1,985,443
HYDRAULIC TRANSMISSION
Filed April 24, 1931   3 Sheets-Sheet 1

Inventor
DONALD CLUTE.
By Wesley P. Merrill
Attorney

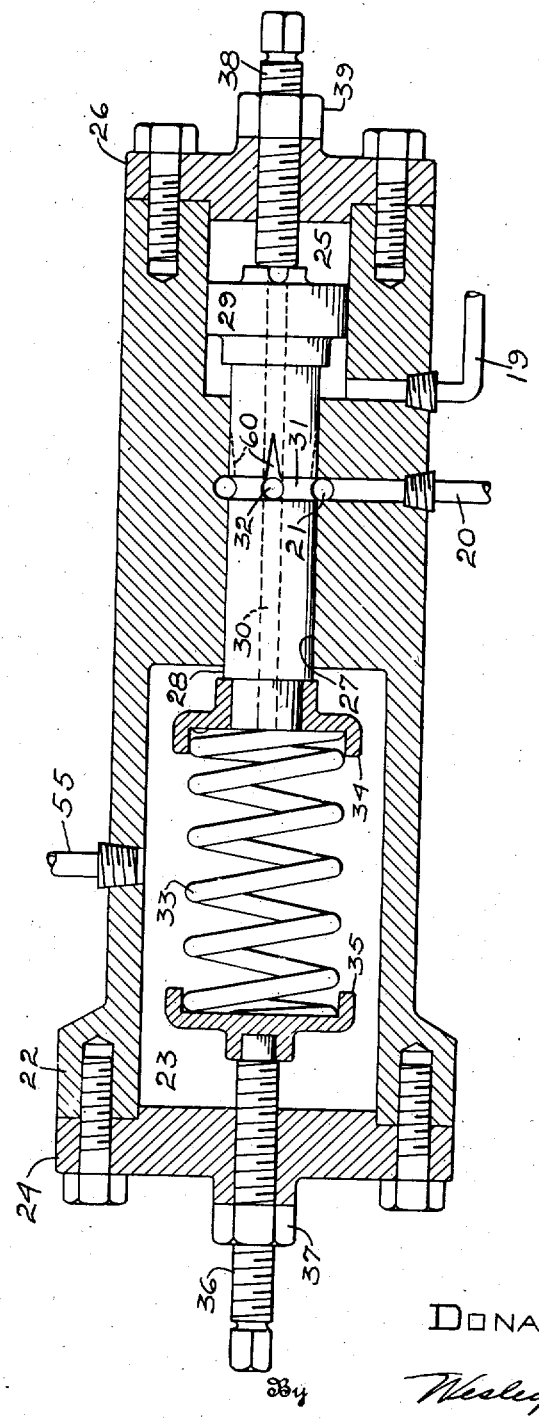

Dec. 25, 1934.  D. CLUTE  1,985,443
HYDRAULIC TRANSMISSION
Filed April 24, 1931   3 Sheets-Sheet 3
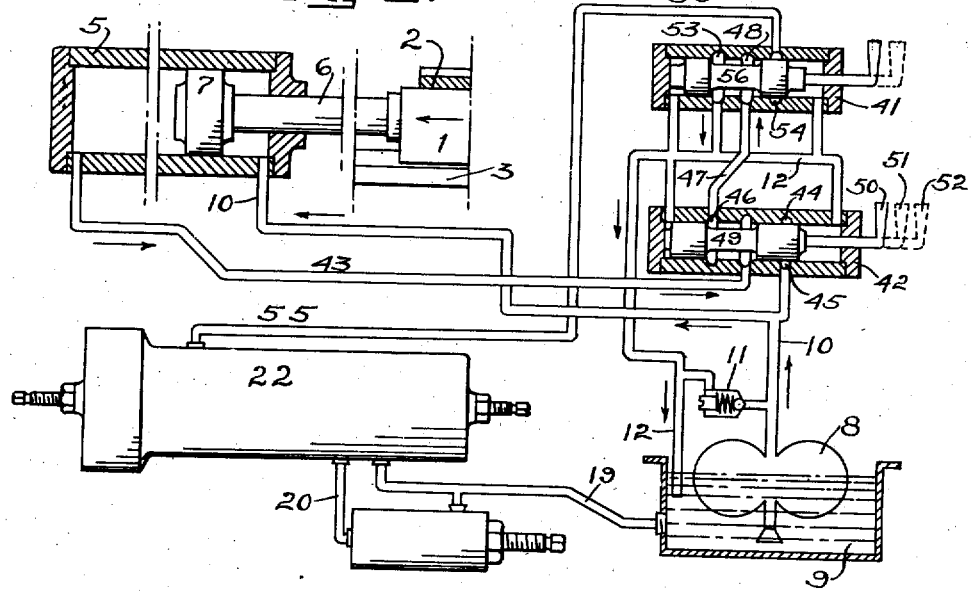
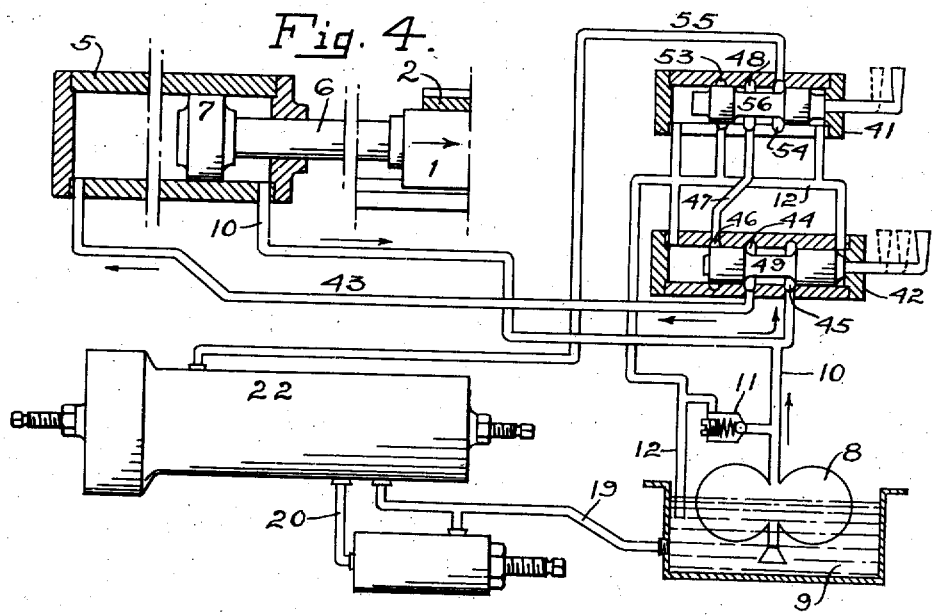
INVENTOR.
DONALD CLUTE.
BY
ATTORNEY.

Patented Dec. 25, 1934

1,985,443

UNITED STATES PATENT OFFICE 1,985,443

HYDRAULIC TRANSMISSION

Donald Clute, Detroit, Mich., assignor to The Oilgear Company, Milwaukee, Wis., a corporation of Wisconsin Application April 24, 1931, Serial No. 532,518

15 Claims. (Cl. 60—52)

This invention relates to a hydraulic transmission of the type which is ordinarily employed for operating the work or tool carriage of a machine tool to produce relative reciprocation between the tool and the work.

The hydraulic transmission to which the invention applies in particular has a hydraulic motor which is supplied with motive liquid from a constant pressure source, a choke or other resistance through which liquid is exhausted from the motor to control motor speed, and a valve to control the delivery of liquid to the motor.

The pressure source is ordinarily a constant displacement pump, such as a gear pump, which has sufficient capacity to operate the motor at a speed greater than the desired speed and which has a relief valve connected thereto and adjusted to open at a pressure higher than the greatest pressure required to operate the motor.

The liquid delivered by the pump tends to operate the motor at a higher speed than desired but is prevented from doing so by the choke which determines the speed of the motor by limiting the rate at which liquid is exhausted therefrom, thereby causing a back pressure to be created in the exhaust chamber of the motor.

Limiting the speed of the motor causes the pressure of the motive liquid to rise until the relief valve opens and permits the escape of liquid delivered by the pump in excess of the volume required to operate the motor at the desired speed, thereby causing the pump to deliver liquid to the motor at a constant pressure as determined by the adjustment of the relief valve.

The force exerted upon the motor piston by the motive liquid is dissipated in moving the carriage of the machine tool and in forcing the exhaust liquid through the choke. Consequently, the back pressure in the exhaust chamber of the motor is equal to the difference between the constant pressure of the motive liquid and the pressure required to cause the motor to perform its work.

The speed of the motor will remain substantially constant if a constant pressure is required to move the carriage but, when the motor is forcing a cutting tool through the work, the pressure required to move the carriage will vary through a wide range with the resultant variation in back pressure and, as the rate of flow through a choke varies according to the pressure of the liquid, the speed of the motor will vary inversely in accordance with variations in tool resistance.

The invention has as an object to provide a hydraulic transmission in which a hydraulic motor is operated by liquid supplied from a constant pressure source and its speed maintained uniformly constant by restricting the discharge of liquid from the motor.

Another object is to maintain the algebraic sum of the pressures in the two ends of the motor substantially proportional to the resistance met by the tool throughout the entire range of tool resistance.

Another object is to provide a hydraulic transmission in which the motor may be operated at either rapid traverse or feed rates.

Another object is to provide a hydraulic transmission which may be operated at rapid traverse rates in either direction.

According to the invention in its general aspect, a hydraulic motor is operated by liquid supplied from a constant pressure source and its speed is controlled by restricting the discharge of liquid from the motor and varying the degree of restriction in response to variations in the pressure of the exhaust liquid.

According to another aspect of the invention, the exhaust of liquid from the motor is restricted when the motor is operating at feed rates and is unrestricted when the motor is operating at rapid traverse rates.

The invention is embodied in the hydraulic transmission illustrated in the accompanying drawings in which the views are as follows:

Fig. 2 is a central longitudinal section through the back pressure valve shown in Fig. 1 but showing its plunger in neutral position.

Fig. 3 is a view similar to Fig. 1 but showing the course of the liquid and the positions of the control valve plungers when the motor is operating at a rapid traverse rate to advance the carriage.

Fig. 4 is a view similar to Fig. 1 but showing the course of the liquid and the positions of the control valve plungers when the motor is operating at a rapid traverse rate to retract the carriage.

Figure 1:
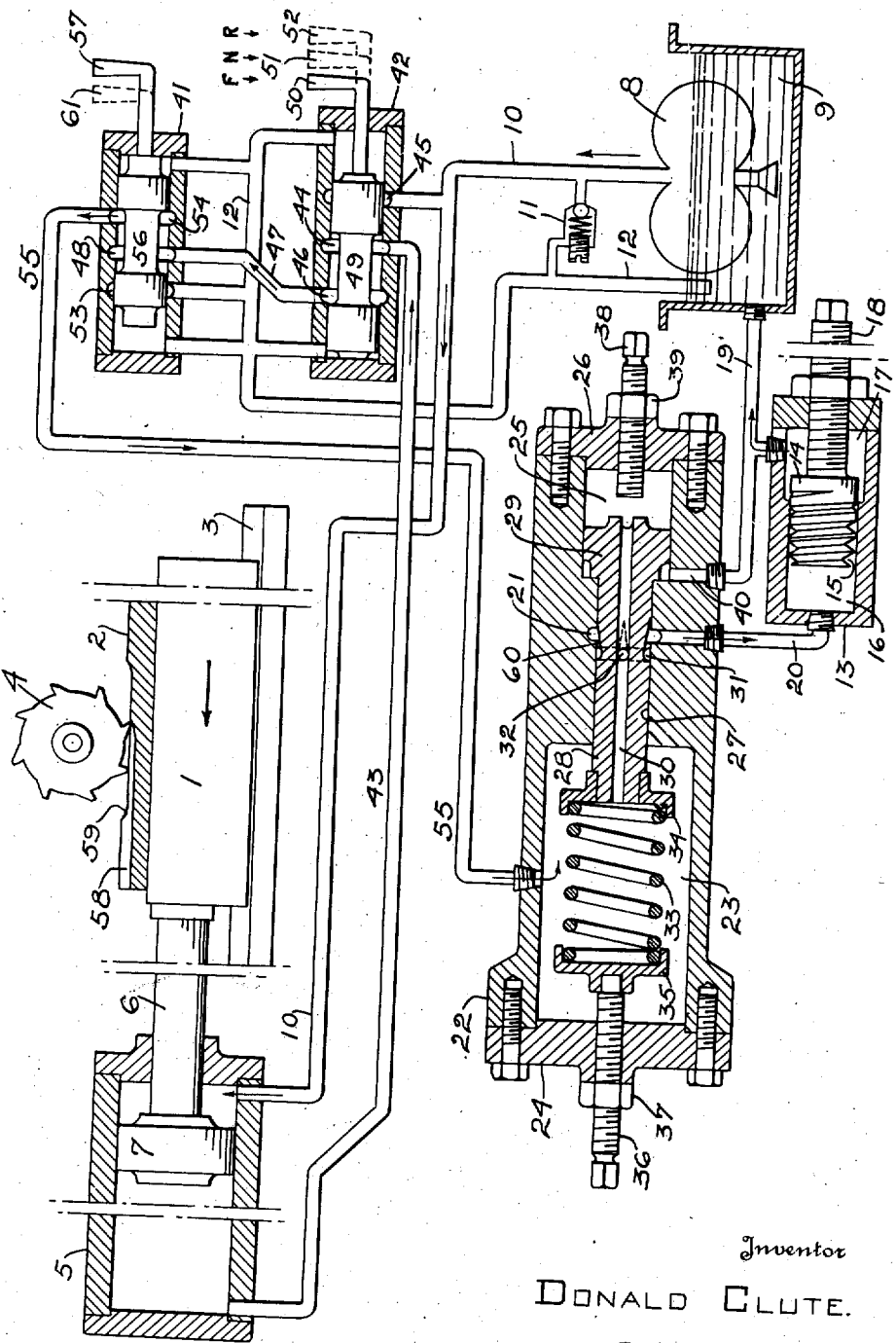
Fig. 1 is a circuit diagram showing the motor connected to the table of a milling machine and the valves and the choke in central longitudinal section, the plungers of the back pressure and control valves being in the positions occupied when the motor is operating at a feed rate and the course of the liquid being indicated by arrows.

The milling machine to which the invention is shown applied has a table or carriage 1 which carries the work 2 and is arranged for reciprocation upon ways 3 to move the work 2 relatively to the milling cutter or tool 4.

The carriage 1 is reciprocated by a reciprocating hydraulic motor 5 which has the rod 6 of its piston 7 connected thereto.

The motor 5 is operated by driving liquid supplied from a source which tends to deliver liquid in greater volume than is required by the motor, such as an accumulator, a constant pressure variable delivery pump, or a constant displacement pump of sufficient capacity.

For the purpose of illustration, the transmission is shown provided with a gear pump 8 which delivers liquid from a reservoir 9 to the pressure or working end of the motor 5 through a supply pipe 10, and the liquid delivered by the pump 8 in excess of the requirements of the motor 5 is exhausted through a relief valve 11 into a return pipe 12 which discharges into the reservoir 9.

The resistance of the relief valve 11 determines the pressure of the liquid in the working end of the motor 5, and an adjustable relief valve may be employed in order that the working pressure may be varied.

In order to govern the speed of the carriage 1 during a working stroke of the machine, the liquid discharged from the exhaust end of the motor 5 is passed through a choke 13 which may be adjustable to vary the rate of flow therethrough and thereby govern the speed of the motor 5.

The choke 13 has a grooved cylinder 14 fitted in its casing and provided upon the outer periphery thereof with a tapered groove 15 through which liquid flows from the inlet end 16 of the choke to the outlet end 17 thereof. The cylinder 14 is provided with a stem 18 which is threaded through the end of the choke casing for advancing and retracting the cylinder 14 to vary the effective area and effective length of the groove 15 and thereby vary the resistance of the choke to the flow of liquid therethrough.

The outlet end 17 of the choke 13 is connected to the reservoir 9 through a discharge pipe 19, and the inlet end 16 thereof is connected by a pipe 20 to the outlet port 21 of a back pressure valve 22 which tends to vary the pressure in the exhaust end of the motor 5 inversely to the resistance met by the tool 4 and thereby maintain the speed of the carriage 1 substantially constant irrespective of varying tool resistance.

The back pressure valve 22 has an inlet chamber 23 arranged at its front end and closed by a removable head 24, a pressure chamber 25 arranged at its rear end and closed by a removable head 26, and an axial bore 27 connecting the two chambers.

The bore 27 has a valve plunger 28 fitted therein and provided upon its rear end with a piston 29 which is fitted in the pressure chamber 25.

The valve plunger 28 has an axial passageway 30, which provides communication between the chambers 23 and 25, and a peripheral groove 31 which communicates with the passageway 30 through radial ducts 32 and normally registers with the outlet port 21.

The spring chamber 23 has a helical compression spring 33 arranged therein between a spring retainer 34 carried by the plunger 28 and a spring retainer 35 carried by an adjusting screw 36 which is threaded through the head 24 to adjust the tension of the spring 33 and is held in adjusted position by a lock nut 37.

The spring 33 urges the plunger 28 rearwardly and, as shown in Fig. 2, it tends to hold the rear end thereof against an adjusting screw 38 which is threaded through the head 26 and held in adjusted position therein by a lock nut 39.

The rearward thrust of the spring 33 is opposed by liquid in the chamber 25 which is open to the exhaust end of the motor 5 during the working stroke of the machine and, in order that liquid seeping past the piston 29 may not build up pressure upon both sides thereof, the front end of the chamber 25 is provided with an outlet 40 to which the discharge pipe 19 is connected.

In order that the motor 5 may be operated at high speed in either direction, a rapid traverse valve 41 and a reversing valve 42 are connected in circuit with the motor 5 and the back pressure valve 22.

The exhaust end of the motor 5 is connected by a pipe 43 to a port 44 which is formed in the reversing valve 42 between two ports 45 and 46 also formed therein.

The port 45 is connected to the supply pipe 10, the port 46 is connected by a pipe 47 to a port 48 in the rapid traverse valve 41, and both ends of the valve 42 are connected to the return pipe 12.

Communication between the port 44 and either the port 45 or the port 46 is controlled by a plunger 49 which has a handle 50 attached to one end thereof for operating it.

When the handle 50 is at F in the position shown in Fig. 1, the port 45 is closed by the plunger 49, the port 46 is open to the port 44 and liquid may flow from the motor 5 through the pipe 43, the valve 42 and the pipe 47 to the valve 41.

When the plunger 49 is moved to the right until the handle 50 is at N in the position indicated by dotted lines at 51, the ports 45 and 46 are both closed by the plunger 49 and liquid is trapped in the exhaust end of the motor 5, thereby holding the motor piston 7 and the carriage 1 stationary, and liquid delivered by the pump 8 is exhausted through the relief valve 11.

When the plunger 49 is moved to the right to the position shown in Fig. 4, at which time the handle 50 is at R in the position indicated by dotted lines at 52 (Figs. 1 and 3), the port 46 is closed by the plunger 49, the port 44 is open to the port 45 and both ends of the motor 5 are open to pump pressure.

Due to the displacement of the piston rod 6, the liquid acting upon the left end of the piston 7 exerts a greater force thereon than the liquid acting upon the right end thereof, and the piston 7 and the carriage 1 are moved to the right.

The liquid expelled from the right end of the motor 5 is bypassed through the pipe 10 and the valve 42 to the left end of the motor 5, as indicated by the arrows in Fig. 4, and the pump 8 need supply only a volume of liquid equal to the displacement of the rod 6. Consequently, the carriage 1 is reversed at high speed.

The port 48 in the rapid traverse valve 41 is arranged between a port 53, which is connected to the return pipe 12, and a port 54 which is connected by a pipe 55 to the chamber 23 of the back pressure valve 22.

The ports 53 and 54 are controlled by a plunger 56 which has a handle 57 attached to one of its ends for operating it, and both ends of the valve 41 are connected to the return pipe 12 to allow the plunger 56 to reciprocate freely and to exhaust any liquid which may seep past the heads on the plunger 56.

When the handle 57 is in the position shown in Fig. 1, the port 53 is closed by the plunger 56, the port 48 is open to the port 54, and liquid exhausted from the motor 5 through the pipe 43, the valve 42 and the pipe 47 may flow through the valve 41 and the pipe 55 to the chamber 23 of the back pressure valve 22, then through the passageway 30, the ducts 32, the port 21 and the pipe 20 to the inlet end 16 of the choke 13, and then through the groove 15, the outlet end 17 and the pipe 19 to the reservoir 9.

The liquid delivered by the pump 8 to the pressure end of the motor 5 urges the piston 7 to the left and tends to exhaust liquid from the left end of the motor 5 faster than it can flow through the choke 13, thereby creating back pressure in the left end of the motor 5 and the same pressure prevails in the compression chamber 25 of the back pressure valve 22 due to its being open through the passageway 30 to the chamber 23 and the pipe 55.

The driving liquid is delivered to the motor 5 at a substantially constant pressure whether it is supplied from an accumulator, a constant pressure variable delivery pump, or a constant delivery pump having a relief valve for the exhaust of excess liquid, such as the gear pump 8 and the relief valve 11.

Consequently, the driving liquid exerts upon the right end of the piston 7 a substantially constant predetermined force which is expended in moving the carriage 1 against the resistance met by the tool 4 and in expelling liquid from the exhaust end of the motor 5.

The discharge of liquid from the exhaust end of the motor is ordinarily resisted by both the choke 13 and the back pressure valve 22 which cause a back pressure to be created in the exhaust end of the motor.

If the tool resistance increases, a greater amount of the force is expended in moving the carriage and a smaller force is available for creating back pressure and, conversely, a greater amount of force is available for creating back pressure if the tool resistance decreases.

Therefore, if the carriage 1 is to be moved at a constant speed, the sum of the forces required to overcome the tool resistance and to expel liquid from the exhaust end of the motor 5 should remain substantially equal to the force exerted upon the right end of the piston 7 by the driving liquid. That is, the pressure in the exhaust end of the motor 5 should vary inversely in accordance with the variation in tool resistance.

The speed of the carriage 1 is initially determined by the adjustment of the choke 13 which is adjusted to provide the desired speed when the tool resistance is the greatest, that is, when the tool 4 is taking either the greatest anticipated cut or the greatest permissible cut, at which time, the smallest amount of energy is available for forcing liquid through the choke 13.

When the tool meets a lesser resistance, less energy is required to move the carriage 1 and the piston 7 exerts a greater force upon the liquid in the exhaust end of the motor 5 and increases the pressure thereof.

The flow of liquid through a choke varies in accordance with the variation in pressure, and the increase in the pressure of the exhaust liquid tends to cause a greater flow through the choke 13 and thereby tends to increase the speed of the carriage 1.

However, the pressure in the chamber 25 also increases and the liquid therein forces the piston 29 to the left against the resistance of the spring 33, thereby restricting the flow of liquid from the passageway 30 to the port 21 and increasing the resistance to the discharge of liquid from the motor 5.

This increased resistance is sufficient to maintain the rate of discharge substantially constant and to cause the pressure of rise in the exhaust end of the motor 5 in accordance with the decrease in the force required to overcome tool resistance, thereby maintaining the speed of the carriage 1 substantially constant.

When the tool is making a heavy cut, as shown at 58, a large force is required to move the carriage 1 and the pressure in the exhaust end of the motor 5 is relatively low. Then, if the tool should suddenly break through the thick part of the metal into a light cut as shown at 59, a much smaller force is required to move the carriage 1 and the large force available tends to move the piston 7 and the carriage 1 faster than the predetermined speed.

However, when the piston 7 tends to move faster than the predetermined speed, it raises the pressure in the exhaust end of the motor 5 and this increase in pressure is instantly transmitted to the liquid in the chamber 25 which forces the plunger 28 forward and restricts the opening between the groove 31 and the port 21, thereby increasing the resistance to the discharge of liquid as previously described.

The distance which the piston 29 moves is slight in actual practice, but it has been exaggerated in the drawings for the purpose of illustrating the parts clearly.

Also, in order to obtain finely graduated feeding speeds and to prevent rebound of liquid in the exhaust pipes, the plunger 28 is provided with tapered grooves 60 which extend from the annular groove 31 rearwardly and outwardly and terminate upon the surface of the plunger 28.

The screw 38 is ordinarily adjusted to prevent further rearward movement of the plunger 28 when the groove 31 is in registry with the port 21, and the tension of the spring 33 is adjusted by means of the screw 36 to hold the rear end of the plunger 28 against the screw 38 until the pressure in the chamber 25 rises above a predetermined minimum which is determined by the adjustment of the choke 13 to produce the desired speed of the carriage 1 when the tool is making the heaviest anticipated cut.

During lighter cuts, the pressure in the chamber 25 rises, as previously described, and the liquid forces the plunger 28 forward to move the groove partly or fully out of registry with the port 21.

In ordinary practice, the pressure prevailing in the chamber 25 during normal operation of the machine tool is high enough to compress the spring 33 sufficiently to move the groove 31 completely out of registry with the port 21 at which time the groove 31 functions merely as a communication groove and the entire volume of exhaust liquid passes through the grooves 60 to the port 21.

It is also possible to eliminate the choke 13 and to provide the entire resistance to the discharge of exhaust liquid by so adjusting the screw 38 that the passageway through which the liquid must flow is restricted sufficiently to provide the necessary minimum back pressure.

The rapid traverse valve 41 is employed to remove the back pressure valve 22 from circuit in order to move the carriage 1 forward at high speed.

When the handle 57 is moved to the position indicated in dotted lines at 61 in Fig. 1 to move the plunger 56 to the position shown in Fig. 3, the port 54 is closed and the port 53 is opened to the port 48.

Liquid exhausted from the motor 5 may then flow through the pipe 43, the valve 42, the pipe 47, and the valve 41 into the return pipe 12 as shown by the arrows in Fig. 3 and, as there is substantially no resistance to the flow of this liquid and as the work 2 is out of engagement with the tool 4 at this time, the pressure required to move the piston 7 is less than that required to open the resistance valve 11. Consequently, the full output of the pump 8 is delivered to the motor 5 and the carriage 1 is moved at high speed.

The invention herein set forth is susceptible of various modifications and adaptations without departing from the scope thereof as hereafter claimed.

The invention is hereby claimed as follows:

1. The combination, with a reciprocating hydraulic motor and a source of pressure liquid connected in circuit with said motor for supplying liquid thereto to operate the same, of means connected to the exhaust end of said motor for resisting the flow of exhaust liquid therefrom to thereby cause back pressure to be created in said motor and to maintain the speed of said motor at a predetermined uniform rate at a given back pressure, means responsive to an increase in said back pressure to add additional resistance to the flow of said exhaust liquid to thereby maintain the speed of said motor at substantially said uniform rate, a valve for directing pressure liquid from said source to both ends of said motor to operate the same at high speed in one direction, and a valve for directing said exhaust liquid past both of said resisting means to thereby allow said motor to operate at high speed in the other direction.

2. The combination, with a reciprocating hydraulic motor and a source of pressure liquid connected in circuit with said motor for supplying liquid thereto to operate the same, of an adjustable choke connected to the exhaust end of said motor for resisting the flow of exhaust liquid therefrom to thereby cause back pressure to be created in said motor and to maintain the speed of said motor at a predetermined uniform rate at a given back pressure, a back pressure valve connected between said choke and said motor and responsive to an increase in said back pressure to add additional resistance to the flow of said exhaust liquid to thereby maintain the speed of said motor at substantially said uniform rate, a valve for directing pressure liquid from said source to both ends of said motor to operate the same at high speed in one direction, and a valve for directing said exhaust liquid past both of said resisting means to thereby allow said motor to operate at high speed in the other direction.

3. The combination, with a hydraulic motor and a source of pressure liquid connected in circuit with said motor for supplying liquid thereto to operate the same, of means for retarding the flow of liquid from the exhaust chamber of said motor including a back pressure valve having a casing provided with an axial bore and an outlet leading from said bore, an inlet chamber arranged at the front end of said casing for connection to the exhaust end of said motor, a pressure chamber arranged at the rear end of said casing and communicating with said inlet chamber for the flow of liquid therebetween, a plunger fitted in said bore and having a passageway to provide communication between said inlet chamber and said outlet, a spring urging said plunger rearward and tending to keep said passageway open, and a piston carried by said plunger and fitted in said pressure chamber to be acted upon by the liquid in said chamber and to urge said plunger forward against the resistance of said spring and restrict said passageway upon the pressure in said pressure chamber exceeding a predetermined maximum, and means for bypassing said exhaust liquid around said retarding means to allow said motor to operate at high speed.

4. The combination, with a hydraulic motor and a source of pressure liquid connected in circuit with said motor for supplying liquid thereto to operate the same, of means for retarding the flow of liquid from the exhaust chamber of said motor including a back pressure valve having a casing provided with an axial bore and an outlet leading from said bore, an inlet chamber arranged at the front end of said casing for connection to the exhaust end of said motor, a pressure chamber arranged at the rear end of said casing and communicating with said inlet chamber for the flow of liquid therebetween, a plunger fitted in said bore and having a passageway to provide communication between said inlet chamber and said outlet, a spring urging said plunger rearward and tending to keep said passageway open, a piston carried by said plunger and fitted in said pressure chamber to be acted upon by the liquid in said chamber and to urge said plunger forward against the resistance of said spring and restrict said passageway upon the pressure in said pressure chamber exceeding a predetermined maximum, and means for adjusting the tension of said spring and the initial position of said plunger, and means for bypassing said exhaust liquid around said retarding means to allow said motor to operate at high speed.

5. The combination, with a hydraulic motor and a source of pressure liquid connected in circuit with said motor for supplying liquid thereto to operate the same, of means for retarding the flow of liquid from the exhaust chamber of said motor including a back pressure valve having a casing provided with an axial bore and an outlet port communicating with said bore, an inlet chamber arranged at the front end of said casing for connection to the exhaust end of said motor, a pressure chamber arranged at the rear end of said casing, a plunger fitted in said bore and having an axial passageway providing communication between said chambers and a port normally registering with said outlet port, a spring urging said plunger rearward and tending to keep said ports in registry, and a piston carried by said plunger and fitted in said pressure chamber to be acted upon by the liquid in said chamber and to urge said plunger forward against the resistance of said spring and restrict the passageway through said ports upon the pressure in said pressure chamber exceeding a predetermined maximum, and means for bypassing said exhaust liquid around said retarding means to allow said motor to operate at high speed.

6. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load, and means responsive to variations in said back pressure for varying the resistance to said discharge of liquid inversely to variations in motor load to thereby maintain the speed of said motor substantially constant under varying loads.

7. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load, means responsive to variations in said back pressure for varying the resistance to said discharge of liquid inversely to variations in motor load to thereby maintain the speed of said motor substantially constant under varying loads, and means for by-passing said discharge liquid around said throttling means to permit said motor to operate at high speed.

8. The combination, with a hydraulic motor for moving a variable load, a constant delivery pump, means connecting said pump to said motor and enabling it to deliver liquid freely and continuously to said motor to operate the same, and a relief valve connected to said pump for permitting liquid delivered thereby to escape after its pressure has reached a predetermined maximum, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load, and means responsive to variations in said back pressure for varying the resistance to said discharge of liquid inversely to variations in motor load to thereby maintain the speed of said motor substantially constant under varying loads.

9. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load and to maintain the speed of said motor at a given uniform rate under a given maximum motor load, and means responsive to an increase in said back pressure for adding additional resistance to said discharge of liquid in proportion to said increase in back pressure to thereby maintain the speed of said motor at substantially said uniform rate under any load less than said maximum.

10. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load and to maintain the speed of said motor at a given uniform rate under a given maximum motor load, and means connected between said motor and said throttling means and responsive to an increase in said back pressure for adding additional resistance to said discharge of liquid in proportion to said increase in back pressure to thereby maintain the speed of said motor at substantially said uniform rate under any load less than said maximum.

11. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising a choke connected to said motor and providing a resistance to the discharge of liquid therefrom to thereby create in said motor a back pressure which varies inversely to variations in motor load and to maintain the speed of said motor at a given uniform rate under a given maximum motor load, and means for controlling the flow of said discharge liquid to said choke and responsive to variations in said back pressure to control said flow and cause said discharge liquid to enter said choke at a uniform pressure whereby said liquid flows through said choke at a substantially uniform rate throughout the entire range of variation in back pressure and motor load.

12. The combination, with a hydraulic motor for moving a variable load, a constant delivery pump, means connecting said pump to said motor and enabling it to deliver liquid freely and continuously to said motor to operate the same, and a relief valve connected to said pump for permitting liquid delivered thereby to escape after its pressure has reached a predetermined maximum, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load, means responsive to variations in said back pressure for varying the resistance to said discharge of liquid inversely to variations in motor load to thereby maintain the speed of said motor substantially constant under varying loads, and valves connected in circuit with said motor for enabling it to operate at high speed in either direction.

13. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load and to maintain the speed of said motor at a given uniform rate under a given maximum motor load, means responsive to an increase in said back pressure for adding additional resistance to said discharge of liquid in proportion to said increase in back pressure to thereby maintain the speed of said motor at substantially said uniform rate under any load less than said maximum, and valves connected in circuit with said motor for enabling it to operate at high speed in either direction.

14. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load and to maintain the speed of said motor at a given uniform rate under a given maximum motor load, means connected between said motor and said throttling means and responsive to an increase in said back pressure for adding additional resistance to said discharge of liquid in proportion to said increase in back pressure to thereby maintain the speed of said motor at substantially said uniform rate under any load less than said maximum, and valves connected in circuit with said motor for enabling it to operate at high speed in either direction.

15. The combination with a hydraulic motor for moving a variable load and means for delivering liquid continuously to said motor in adequate volume and at a constant pressure to operate the same, of means for controlling the discharge of liquid from said motor to thereby maintain its speed constant, comprising a choke connected to said motor and providing a resistance to the discharge of liquid therefrom to thereby create in said motor a back pressure which varies inversely to variations in motor load and to maintain the speed of said motor at a given uniform rate under a given maximum motor load, means for controlling the flow of said discharge liquid to said choke and responsive to variations in said back pressure to control said flow and cause said discharge liquid to enter said choke at a substantially uniform pressure whereby said liquid flows through said choke at a substantially uniform rate through the entire range of variation in back pressure and motor load, and valves connected in circuit with said motor for enabling it to operate at high speed in either direction.

DONALD CLUTE.

DISCLAIMER 1,985,443.—*Donald Clute*, Detroit, Mich. HYDRAULIC TRANSMISSION. Patent dated December 25, 1934. Disclaimer filed February 15, 1939, by the assignee, *The Oilgear Company*.

Hereby enters this disclaimer to claims 6, 7, 8, 9, 10, 11, 13, 14, and 15 of said Letters Patent.

[*Official Gazette March 14, 1939.*]

enabling it to operate at high speed in either direction.

14. The combination, with a hydraulic motor for moving a variable load and means for delivering liquid continuously to said motor in adequate volume and at a constant pressure to operate the same, of means for controlling the discharge of liquid from said motor to thereby maintain its speed constant, comprising throttling means connected to said motor and providing a resistance to the discharge of liquid therefrom to thereby create in said motor a back pressure which varies inversely to variations in motor load and to maintain the speed of said motor at a given uniform rate under a given maximum motor load, means connected between said motor and said throttling means and responsive to an increase in said back pressure for adding additional resistance to said discharge of liquid in proportion to said increase in back pressure to thereby maintain the speed of said motor at substantially said uniform rate under any load less than said maximum, and valves connected in circuit with said motor for enabling it to operate at high speed in either direction.

15. The combination with a hydraulic motor for moving a variable load and means for delivering liquid continuously to said motor in adequate volume and at a constant pressure to operate the same, of means for controlling the discharge of liquid from said motor to thereby maintain its speed constant, comprising a choke connected to said motor and providing a resistance to the discharge of liquid therefrom to thereby create in said motor a back pressure which varies inversely to variations in motor load and to maintain the speed of said motor at a given uniform rate under a given maximum motor load, means for controlling the flow of said discharge liquid to said choke and responsive to variations in said back pressure to control said flow and cause said discharge liquid to enter said choke at a substantially uniform pressure whereby said liquid flows through said choke at a substantially uniform rate through the entire range of variation in back pressure and motor load, and valves connected in circuit with said motor for enabling it to operate at high speed in either direction.

DONALD CLUTE.

DISCLAIMER 1,985,443.—*Donald Clute*, Detroit, Mich. HYDRAULIC TRANSMISSION. Patent dated December 25, 1934. Disclaimer filed February 15, 1939, by the assignee, *The Oilgear Company*.

Hereby enters this disclaimer to claims 6, 7, 8, 9, 10, 11, 13, 14, and 15 of said Letters Patent.

[*Official Gazette March 14, 1939.*]